US012791146B2

(12) United States Patent
Schuh et al.

(10) Patent No.: US 12,791,146 B2
(45) Date of Patent: Nov. 10, 2026

(54) IN-WALL MOUNTING SYSTEM FOR FLAT PANEL TELEVISIONS

(71) Applicant: Legrand AV Inc., Minnetonka, MN (US)

(72) Inventors: Mathew Schuh, Minnetonka, MN (US); Dorian Farid Haro Gonzalez, Minnetonka, MN (US); Adam Maves, Minnetonka, MN (US)

(73) Assignee: LEGRAND AV INC., Minnetonka, MN (US)

(*) Notice: Subject to any disclaimer, the term of this patent is extended or adjusted under 35 U.S.C. 154(b) by 0 days.

(21) Appl. No.: 19/165,389

(22) PCT Filed: Mar. 14, 2024

(86) PCT No.: PCT/US2024/019975

§ 371 (c)(1),
(2) Date: Sep. 15, 2025

(87) PCT Pub. No.: WO2024/192264

PCT Pub. Date: Sep. 19, 2024

(65) Prior Publication Data

US 2026/0117922 A1 Apr. 30, 2026

Related U.S. Application Data

(60) Provisional application No. 63/452,256, filed on Mar. 15, 2023.

(51) Int. Cl.

| | |
|---|---|
| ***F16M 13/02*** | (2006.01) |
| ***F16M 11/10*** | (2006.01) |
| ***F16M 11/20*** | (2006.01) |

(52) U.S. Cl.
CPC ............ *F16M 13/02* (2013.01); *F16M 11/10* (2013.01); *F16M 11/2092* (2013.01); *F16M 2200/061* (2013.01)

(58) Field of Classification Search
CPC .. F16M 13/02; F16M 11/10; F16M 2200/061; F16M 11/2092
See application file for complete search history.

(56) References Cited

U.S. PATENT DOCUMENTS 7,975,976 B2 * 7/2011 Wohlford ........... F16M 11/2014 52/27
8,837,127 B2 * 9/2014 Dittmer .................. F16M 13/02 361/679.01

(Continued)

FOREIGN PATENT DOCUMENTS

WO WO-2008085897 A2 * 7/2008 ............. F16M 11/38

OTHER PUBLICATIONS

International Search Report for PCT/US2024/019975, dated Jul. 9, 2024 (4 pgs).

(Continued)

*Primary Examiner* — Bradley Duckworth
(74) *Attorney, Agent, or Firm* — Bradley J. Thorson; DeWitt LLP

(57) ABSTRACT

Systems and methods are provided enabling installation of an in-wall enclosure and television mount that alleviates the drawbacks of the prior art mounts. The inventions encompass a flexible and modular approach to mounting larger televisions on a stud wall with an in-wall enclosure without the necessity to cut studs to install headers. Peripherals such as controllers, receivers, routers, and associated wiring can be installed inside the in-wall enclosure for purposes of concealment and enabling the television to be positioned closer to the wall without interference. The enclosures can be installed on both sides of a stud wall, and can be used with surface mounts to enable a wide range of mounting solutions for large televisions and arrays of television displays.

23 Claims, 12 Drawing Sheets

(56) References Cited

U.S. PATENT DOCUMENTS

| | | | | |
|---|---|---|---|---|
| 11,033,107 | B2 * | 6/2021 | Warren | F16M 11/24 |
| 11,647,838 | B2 * | 5/2023 | Warren | A47B 97/001 248/277.1 |
| 2005/0253035 | A1 | 11/2005 | Dozier | |
| 2007/0170325 | A1 * | 7/2007 | Ryu | F16M 11/2014 248/276.1 |
| 2009/0050763 | A1 | 2/2009 | Dittmer | |
| 2009/0278007 | A1 * | 11/2009 | Taylor | F16M 13/02 248/220.21 |
| 2012/0043437 | A1 * | 2/2012 | Townsend | F16M 11/10 29/428 |
| 2013/0193092 | A1 | 8/2013 | Stifal | |
| 2016/0173809 | A1 | 6/2016 | Millson et al. | |
| 2017/0224108 | A1 | 8/2017 | McGowan et al. | |
| 2021/0015255 | A1 | 1/2021 | Brandt et al. | |
| 2021/0148507 | A1 | 5/2021 | Vinton | |

OTHER PUBLICATIONS

Written Opinion for PCT/US2024/019975, dated Jul. 9, 2024 (3 pgs).

European Patent Office, Extended European Search Report dated Mar. 20, 2026, in corresponding related European Patent Application No. 24771748.1, 7 pages.

* cited by examiner

IN-WALL MOUNTING SYSTEM FOR FLAT PANEL TELEVISIONS

RELATED APPLICATIONS

The present application claims priority to PCT Application No. PCT/US2024/019975, entitled IN-WALL MOUNTING SYSTEM FOR FLAT PANEL TELEVISIONS, filed Mar. 14, 2024, and claims the benefit of U.S. Provisional Application No. 63/452,256, entitled IN-WALL MOUNTING SYSTEM FOR FLAT PANEL TELEVISIONS, filed Mar. 15, 2023, said application being hereby fully incorporated herein in its entirety by reference in their entirety.

TECHNICAL FIELD

The invention is related to television mounts, and more specifically television mounting systems defining in-wall enclosures.

BACKGROUND

Flat screen televisions and monitors, such as those using LCD, LED, or OLED technology, have become very common. Such devices can provide a large, lightweight, high performance display screen that is also very thin. As technology has improved and prices have decreased, devices with very large display screens, for example 55 diagonal inches and up, have become popular. Also, it can be desirable in larger spaces to mount multiple screens adjacently in an array.

It is often desirable for televisions to be mounted to be freely maneuverable to adjust the orientation of the screen to fit user preferences. For this reason, mounts often have extendable arms and tilt and swivel capability-referred to in the industry as "full-motion" mounts. Especially with larger screens, it is important that the screen be securely mounted and stably supported to prevent wobbling and sagging, and for safety reasons. This means that it is desirable to connect the screen to the mount at two spaced-apart locations.

Moreover, it can be desirable for a television mount to have an enclosure recessed into the well to contain peripheral devices and wiring that interfere with the ability to position the television close to the wall, and that are also unsightly. A drawback of prior art in-wall mounts is that if an enclosure that spans multiple stud spacings is desired, it is necessary to cut the wall along the entire width of the enclosure to install headers to frame the top and bottom of the enclosure. This leads to increased expense and effort for installation.

What is needed are systems and methods that enable installation of an in-wall enclosure and television mount that alleviates the drawbacks of the prior art mounts.

SUMMARY

According to embodiments of the inventions disclosed herein, systems and methods are provided that enable installation of an in-wall enclosure and television mount to alleviate the drawbacks of the prior art mounts. These embodiments encompass a flexible and modular approach to mounting larger televisions on a stud wall with an in-wall enclosure without the necessity to cut studs to install headers. Peripherals such as controllers, receivers, routers, and associated wiring can be installed inside the in-wall enclosure for purposes of concealment and enabling the television to be positioned closer to the wall without interference. The enclosures can be installed on both sides of a stud wall, and can be used with surface mounts to enable a wide range of mounting solutions for large televisions and arrays of television displays.

In an embodiment, a mount for attaching an electronic display device to a wall of a structure includes a housing having a pair of opposing side walls, a top wall, a bottom wall, and a rear wall defining an enclosure with a front opening; a pair of side flanges, each side flange presenting a front face and operably coupled to a separate one of the opposing side walls such that the side flange is selectively shiftable to alter a first distance between the front face and the rear wall of the housing. The mount further includes a pair of spaced-apart interface rails extending between the opposing side walls of the housing, each interface rail having a projecting lip, each the interface rail being selectively shiftable to alter a second distance between the projecting lip of the interface rail and the rear wall of the housing, and a pair of display mounts, each display mount removably coupled to each of the interface rails and adapted to attach to the electronic display device to couple the electronic display device to the housing.

In embodiments, the mount further includes an attachment plate disposed inside the enclosure of the housing, the attachment plate adapted to receive a plurality of peripheral electronic devices selected from the group consisting of controllers, receivers, routers, and power supplies. The housing can include a plurality of brackets adapted to attach the housing to a pair of spaced-apart studs of the wall, or each of the side flanges can have a plurality of hardware attachment assemblies for attaching the housing to the wall, each hardware attachment assembly comprising a threaded fastener, a nut, and a clamp.

In embodiments, each of the pair of display mounts includes an inner assembly and an outer assembly coupled by a pair of scissor arms, the inner assembly coupled to the interface rails and the outer assembly adapted to attach to the electronic display device, the scissor arms enabling the electronic display device to be selectively shifted between a first position proximate the housing and a second position spaced-apart from the housing. The outer assembly can include a channel operably coupled to the scissor arms and a display interface adapted to attach to the electronic display device, the display interface operably coupled with the channel so as to enable the display interface to be selectively shifted relative to the channel to vertically tilt the electronic display device. The display interface may be operably coupled with the channel with a tilt adjustment bracket, the tilt adjustment bracket providing a plurality of detent stops such that the electronic display device can be disposed at a plurality of pre-defined tilt positions. The outer assembly may further include a vertical adjustment assembly enabling selective vertical shifting of the outer assembly relative to the scissor arms.

In further embodiments, a system for mounting an electronic display device to a wall of a structure, the system includes a plurality of mounts. Each mount includes a housing having a pair of opposing side walls, a top wall, a bottom wall, and a rear wall defining an enclosure with a front opening; a pair of side flanges, each side flange presenting a front face and operably coupled to a separate one of the opposing side walls such that the side flange is selectively shiftable to alter a first distance between the front face and the rear wall of the housing; a pair of spaced-apart interface rails extending between the opposing side walls of the housing, each interface rail having a projecting lip, each the interface rail being selectively shiftable to alter a second distance between the projecting lip of the interface rail and the rear wall of the housing; and a display mount, the display mount removably coupled to each of the interface rails. The display mount of a first one of the plurality of mounts and the display mount of a second one of the plurality of mounts are attached to the electronic display device to attach the electronic display device to the wall.

According to the system, at least one of the plurality of mounts further includes an attachment plate disposed inside the enclosure of the housing, the attachment plate adapted to receive a plurality of peripheral electronic devices selected from the group consisting of controllers, receivers, routers, and power supplies.

In embodiments, the housing of each mount further includes a plurality of brackets adapted to attach the housing to a pair of spaced-apart studs of the wall, or each of the side flanges of each mount includes a plurality of hardware attachment assemblies for attaching the housing to a wall of a structure, each hardware attachment assembly comprising a threaded fastener, a nut, and a clamp.

In embodiments, each of the display mounts includes an inner assembly and an outer assembly coupled by a pair of scissor arms, the inner assembly coupled to the interface rails and the outer assembly adapted to attach to the electronic display device, the scissor arms enabling the electronic display device to be selectively shifted between a first position proximate the housing and a second position spaced-apart from the housing. The outer assembly can include a channel operably coupled to the scissor arms and a display interface adapted to attach to the electronic display device, the display interface operably coupled with the channel so as to enable the display interface to be selectively shifted relative to the channel to vertically tilt the electronic display device. The display interface may be operably coupled with the channel with a tilt adjustment bracket, the tilt adjustment bracket providing a plurality of detent stops such that the electronic display device can be disposed at a plurality of pre-defined tilt positions. The outer assembly may further include a vertical adjustment assembly enabling selective vertical shifting of the outer assembly relative to the scissor arms.

In further embodiments, an electronic display system includes a wall having a plurality of spaced-apart studs forming a plurality of stud spaces therebetween, and a membrane on one side of the studs, a plurality of electronic display devices, and a plurality of mounts. Each mount includes a housing having a pair of opposing side walls, a top wall, a bottom wall, and a rear wall defining an enclosure with a front opening; a pair of side flanges, each side flange presenting a front face and operably coupled to a separate one of the opposing side walls such that the side flange is selectively shiftable to alter a first distance between the front face and the rear wall of the housing; a pair of spaced-apart interface rails extending between the opposing side walls of the housing, each interface rail having a projecting lip, each the interface rail being selectively shiftable to alter a second distance between the projecting lip of the interface rail and the rear wall of the housing; and at least one display mount, each display mount removably coupled to each of the interface rails and adapted to attach to the electronic display device to couple the electronic display device to the housing. Each mount of the plurality of mounts may be arranged in a separate one of the plurality of stud spaces and through an aperture in the membrane.

In embodiments, at least one of the plurality of mounts may further include an attachment plate disposed inside the enclosure of the housing, the attachment plate adapted to receive a plurality of peripheral electronic devices selected from the group consisting of controllers, receivers, routers, and power supplies. Each mount of the plurality of mounts may be arranged immediately adjacent another one of the plurality of mounts. Each of the display mounts can include an inner assembly and an outer assembly coupled by a pair of scissor arms, the inner assembly coupled to the interface rails and the outer assembly adapted to attach to the electronic display device, the scissor arms enabling the electronic display device to be selectively shifted between a first position proximate the housing and a second position spaced-apart from the housing. The outer assembly may include a channel operably coupled to the scissor arms and a display interface adapted to attach to the electronic display device, the display interface operably coupled with the channel so as to enable the display interface to be selectively shifted relative to the channel to vertically tilt the electronic display device.

The display interface may be operably coupled with the channel with a tilt adjustment bracket, the tilt adjustment bracket providing a plurality of detent stops such that the electronic display device can be disposed at a plurality of pre-defined tilt positions, and the outer assembly may further include a vertical adjustment assembly enabling selective vertical shifting of the outer assembly relative to the scissor arms.

The above summary is not intended to describe each illustrated embodiment or every implementation of the subject matter hereof. The figures and the detailed description that follow more particularly exemplify various embodiments.

BRIEF DESCRIPTION OF THE DRAWINGS

The subject matter hereof may be more completely understood in consideration of the following detailed description of various embodiments in connection with the accompanying figures, in which.

Figure 1:
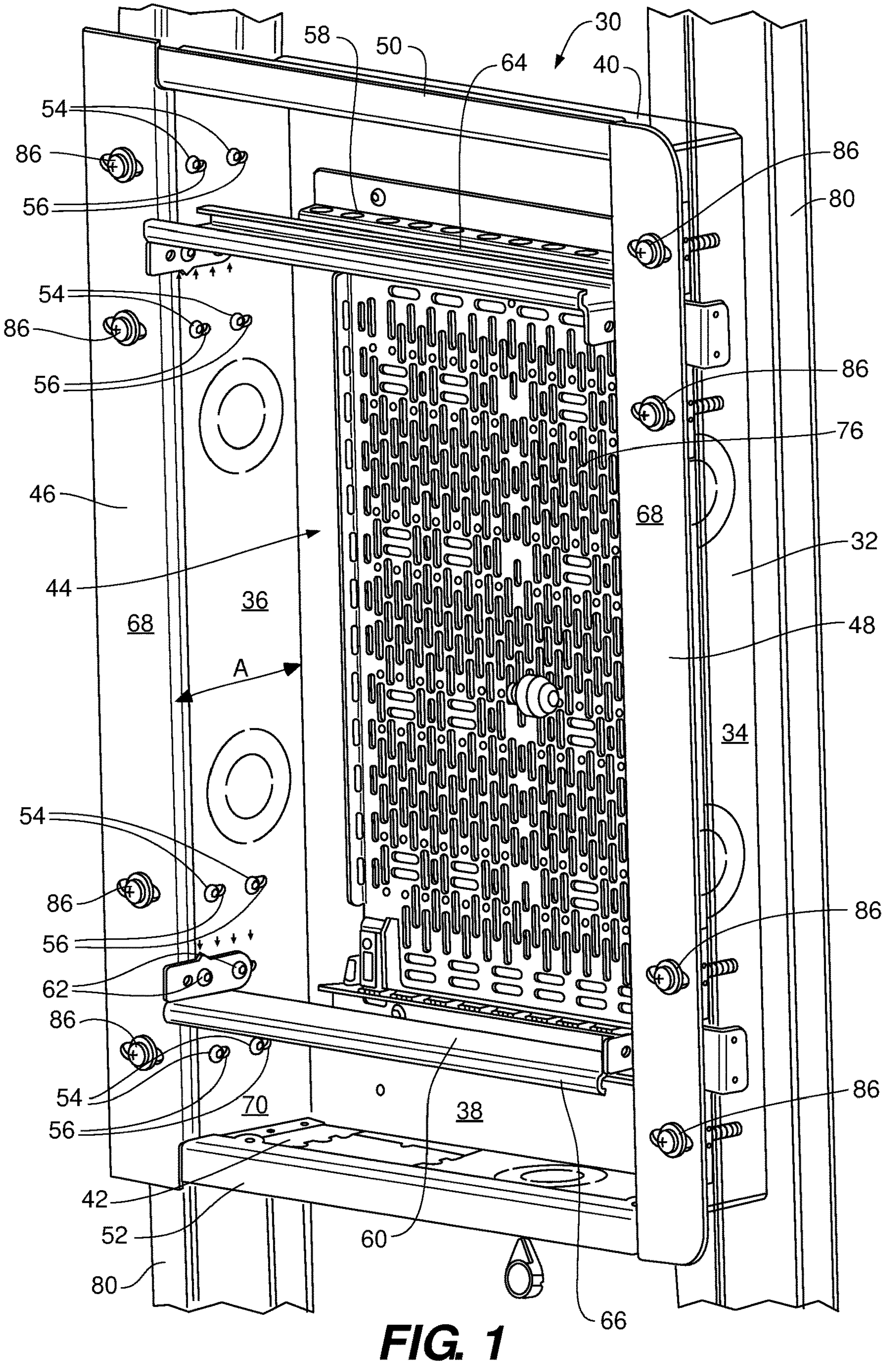
FIG. 1 is a front isometric view of an in-wall enclosure according to embodiments of the invention.
Figure 2:
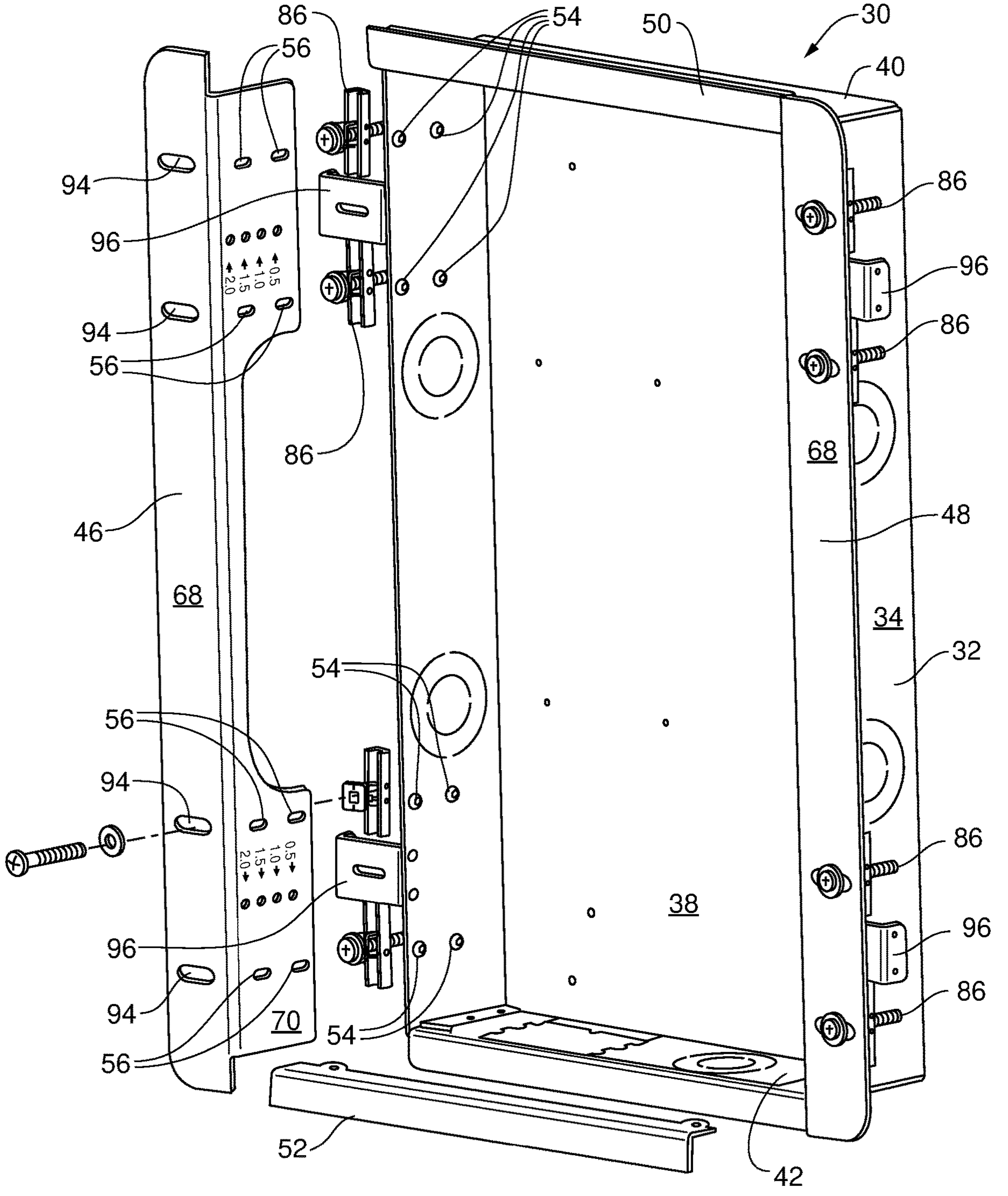
FIG. 2 is a partially exploded view of the in-wall enclosure of FIG. 1.

While various embodiments are amenable to various modifications and alternative forms, specifics thereof have been shown by way of example in the drawings and will be described in detail. It should be understood, however, that the intention is not to limit the claimed inventions to the embodiments described. On the contrary, the invention is to cover all modifications, equivalents, and alternatives falling within the spirit and scope of the subject matter as defined by the claims.

DETAILED DESCRIPTION OF THE DRAWINGS

Figure 3:
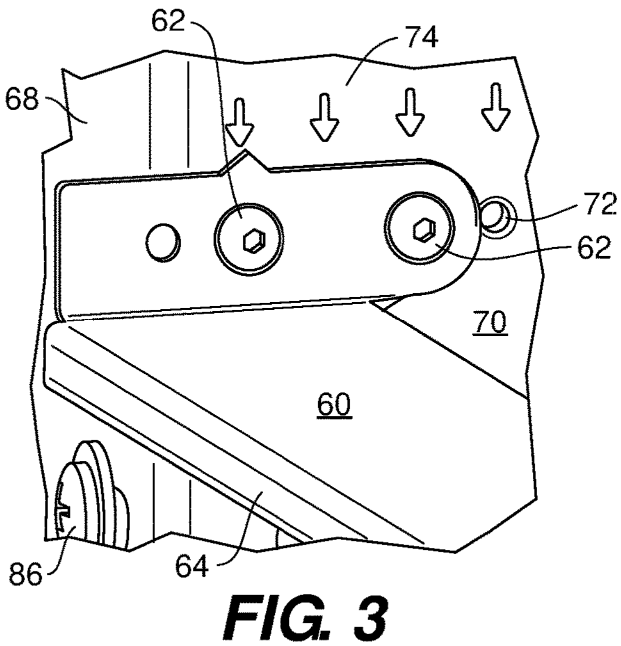
FIG. 3 is a close-up view of a portion of the in-wall enclosure of FIG. 1 depicting the connection of one of the interface rails to a side flange.
Figure 4:
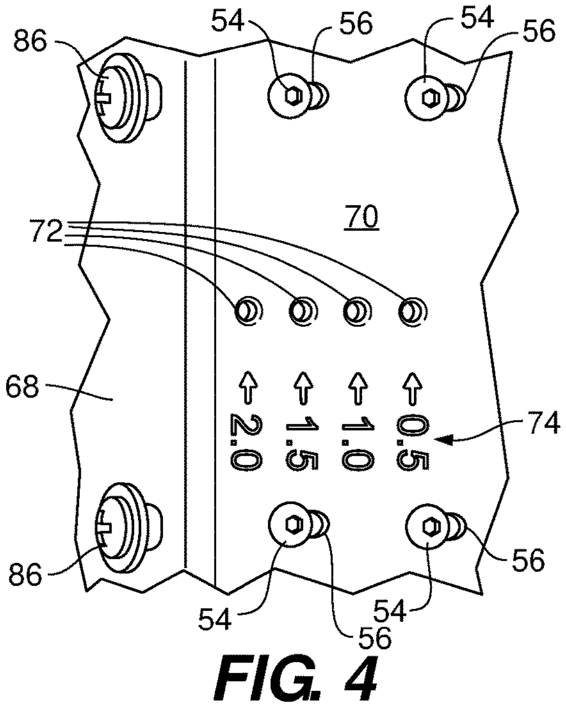
FIG. 4 is a close-up view of a portion of the in-wall enclosure of FIG. 1 depicting the apertures for connection with the in-wall box to a side flange.
Figure 5:
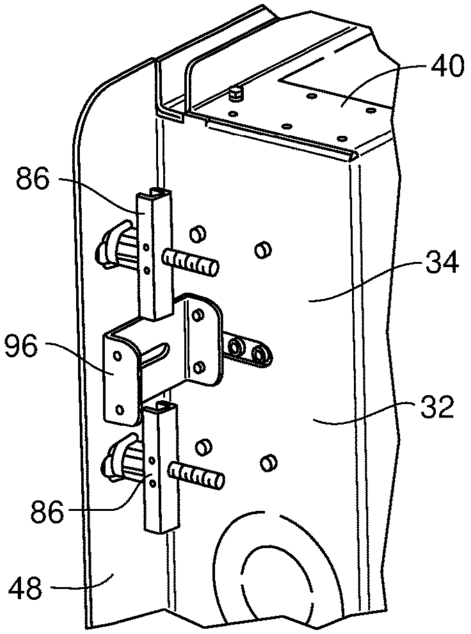
FIG. 5 is a rear isometric view of a portion of the in-wall enclosure of FIG. 1 depicting the side flange and attachment hardware.
Figure 6:
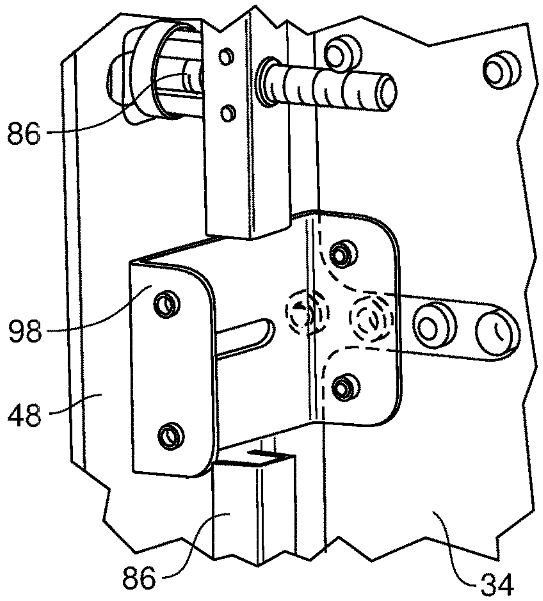
FIG. 6 is another rear isometric view of a portion of the in-wall enclosure of FIG. 1 depicting the side flange and attachment hardware.

As depicted in FIG. 1, in-wall enclosure 30 generally includes housing 32, having side walls 34, 36, rear wall 38, top wall 40, bottom wall 42, and defining front opening 44. Enclosure 30 further includes side flanges 46, 48, top flange 50 and bottom connector 52. Side flanges 46, 48, are attached to housing 32 with fasteners 54 that extend through elongated slots 56 defined in side flanges 46, 48, to enable adjustment of depth dimension A and to account for varying thicknesses of sheetrock as explained in more detail below. Interface rails 58, 60 are secured to side flanges 46, 48, with fasteners 62. Interface rails 58, 60, have projecting lips 64, 66, respectively. Each of the side flanges 46,48, have front face 68 and rearwardly extending connection portion 70. Connection portion 70 can have a series of appropriately spaced apertures 72 for receiving fasteners 62 enabling projecting lips 64, 66, Of interface rails 58, 60, to be positioned at a plurality of desired positions relative to front face 68 and rear wall 38. Indicia 74 as depicted in FIGS. 3 and 4 can be provided to assist a user in positioning interface rails 58, 60. Attachment plate 76 can be affixed to rear wall 38 to enable attachment of peripherals such as controllers, receivers, routers, power supplies, and the like inside the enclosure provided by in-wall enclosure 30.

Figure 7:
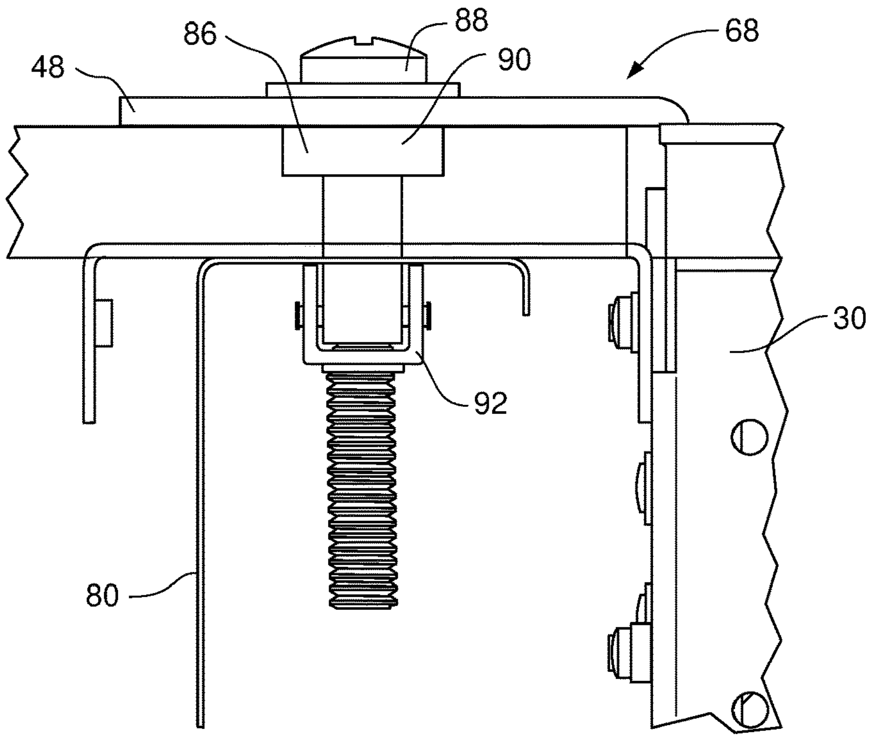
FIG. 7 is a top plan view of one of the side flanges and attachment hardware of FIGS. 5 and 6 with a wall membrane depicted in phantom.
Figure 8:
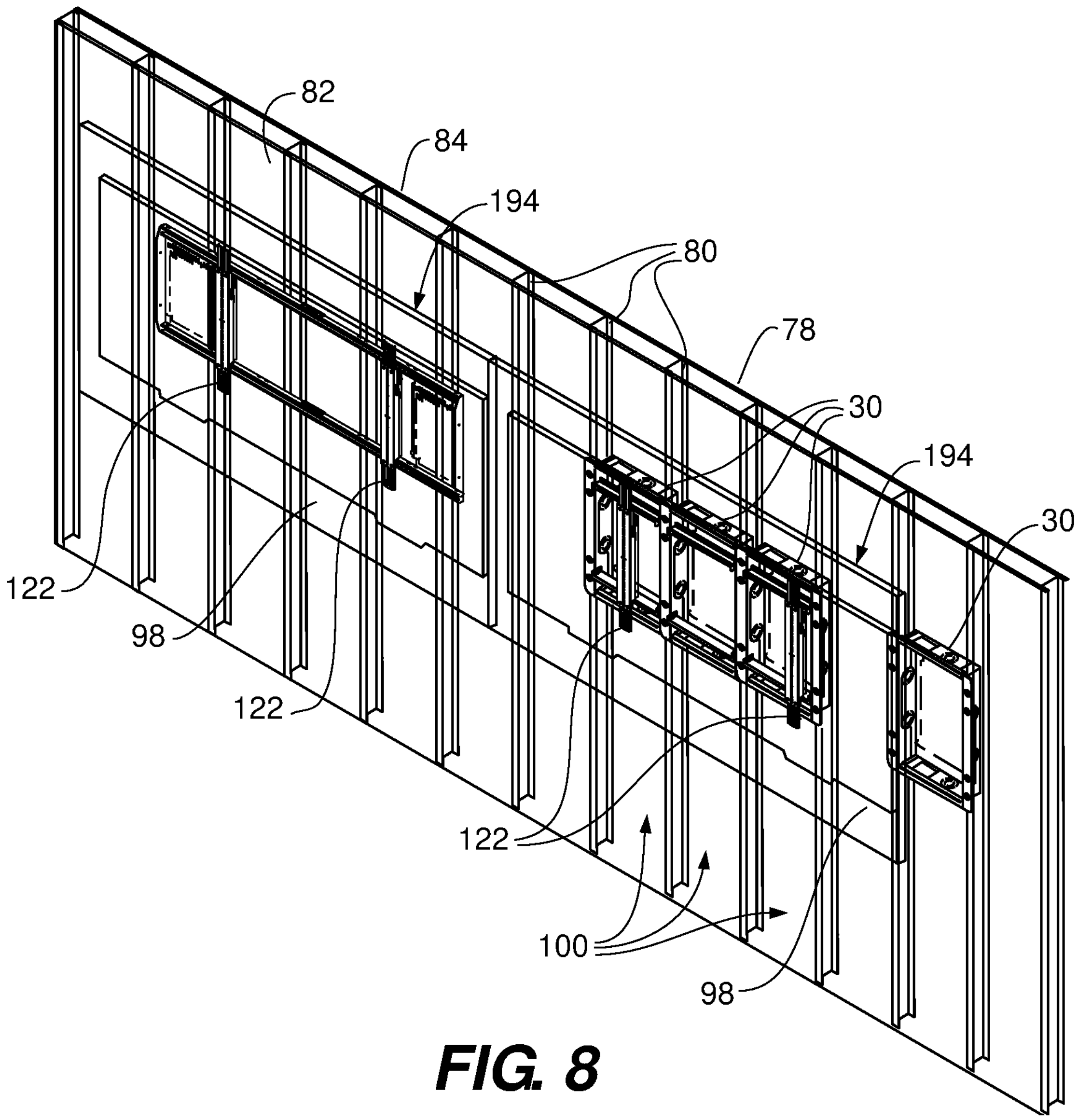
FIG. 8 is a front isometric view of a wall and mount assembly according to an embodiment of the invention with the wall depicted in phantom.
Figure 9:
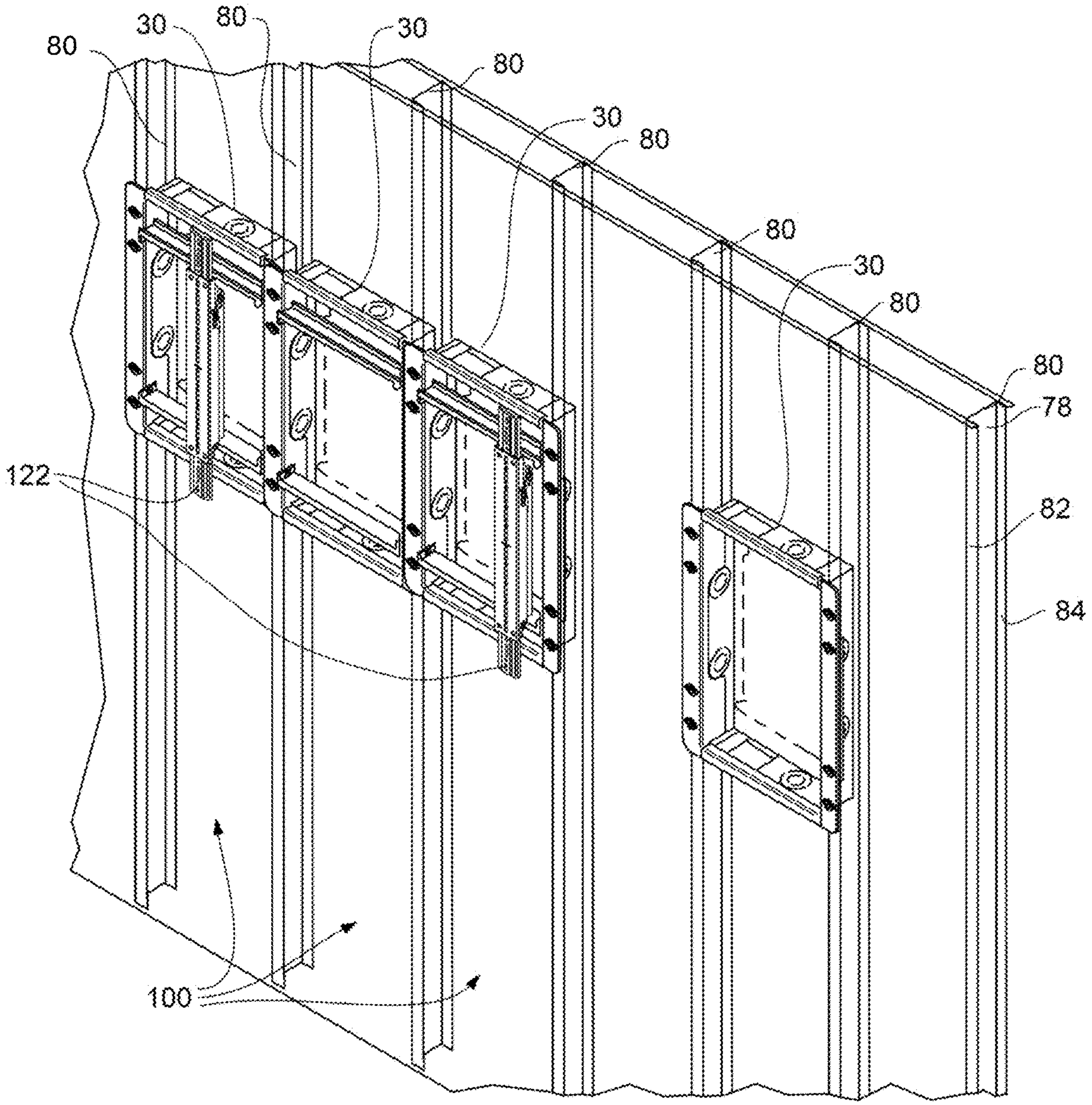
FIG. 9 is a partial isometric view of the wall and mount assembly of FIG. 8 with the wall depicted in phantom.
Figure 10:
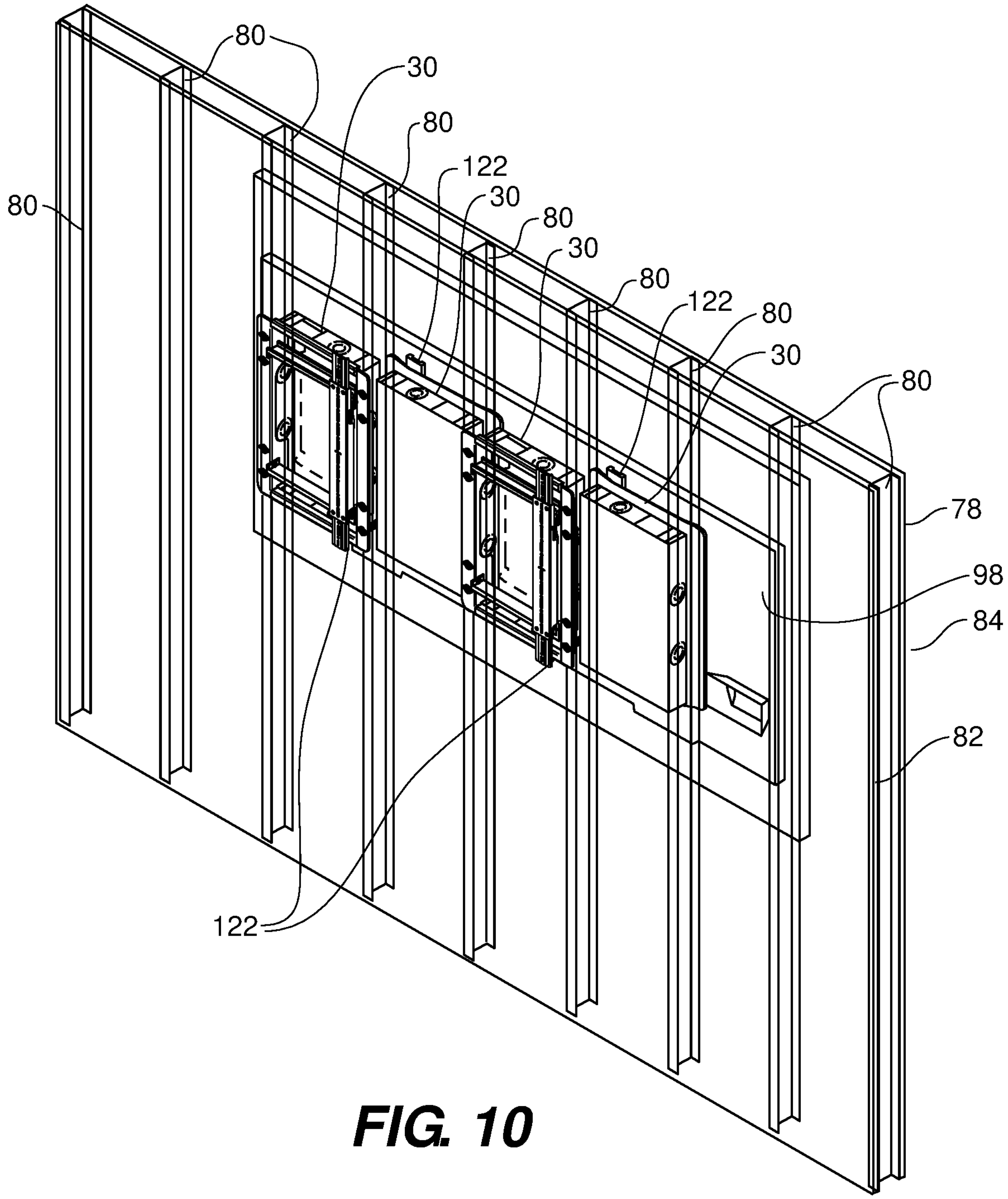
FIG. 10 is a front isometric view of a wall and mount assembly according to an embodiment of the invention with mount on both sides of the wall and the wall depicted in phantom.
Figure 12:
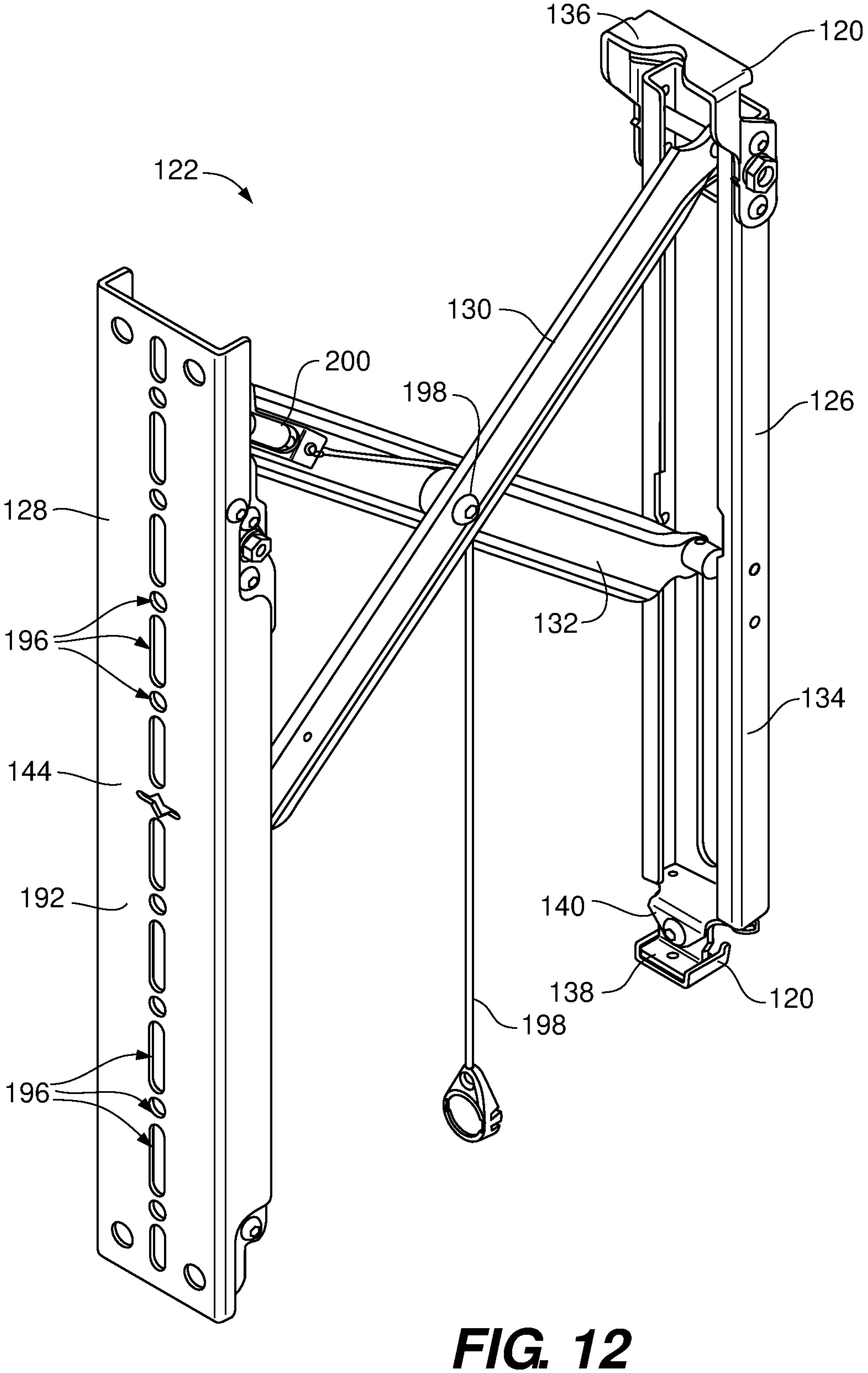
FIG. 12 is a front isometric view of a display mount according to an embodiment of the invention.
Figure 13:
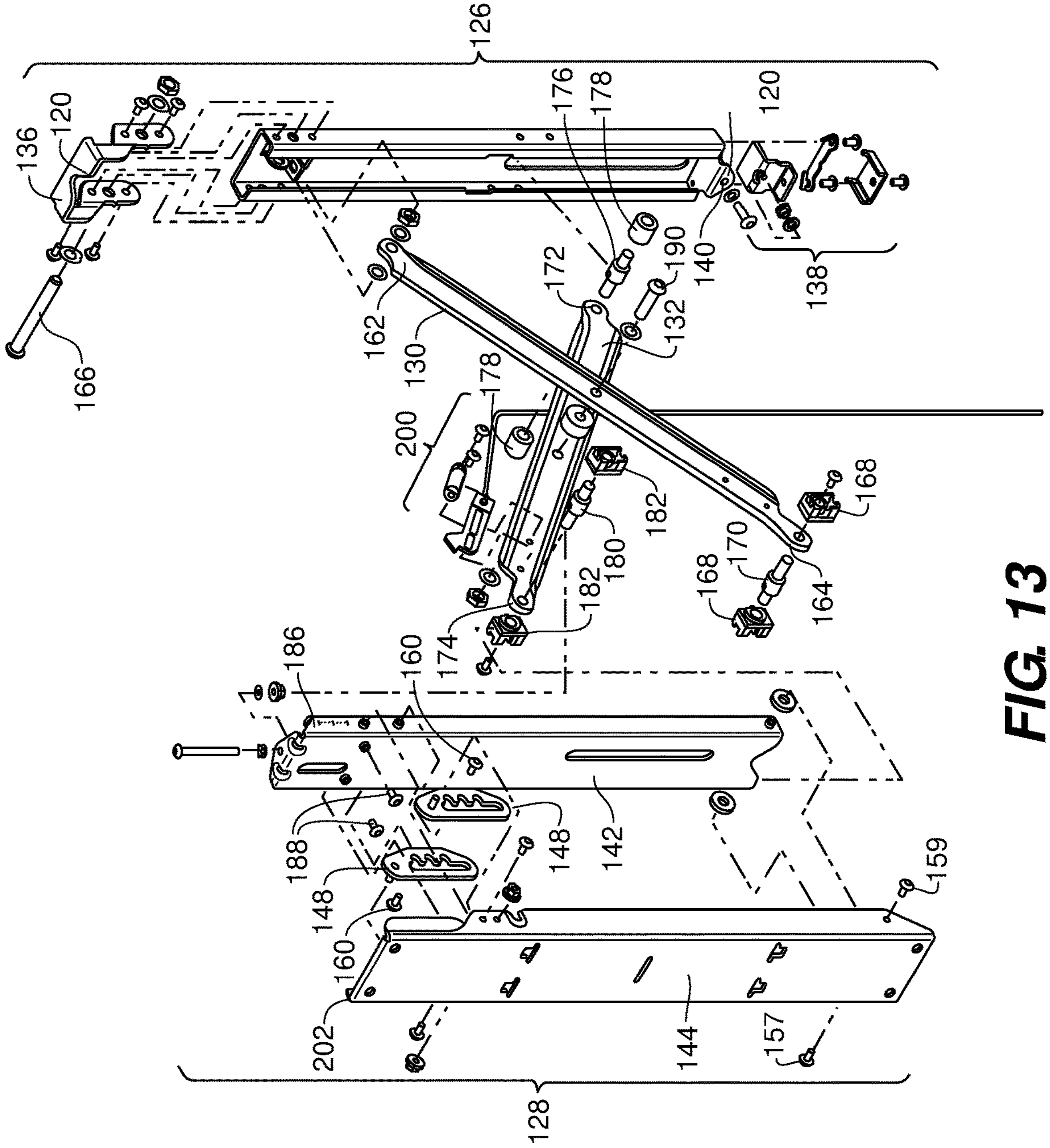
FIG. 13 is a partial exploded view of the display mount of FIG. 12.
Figure 14:
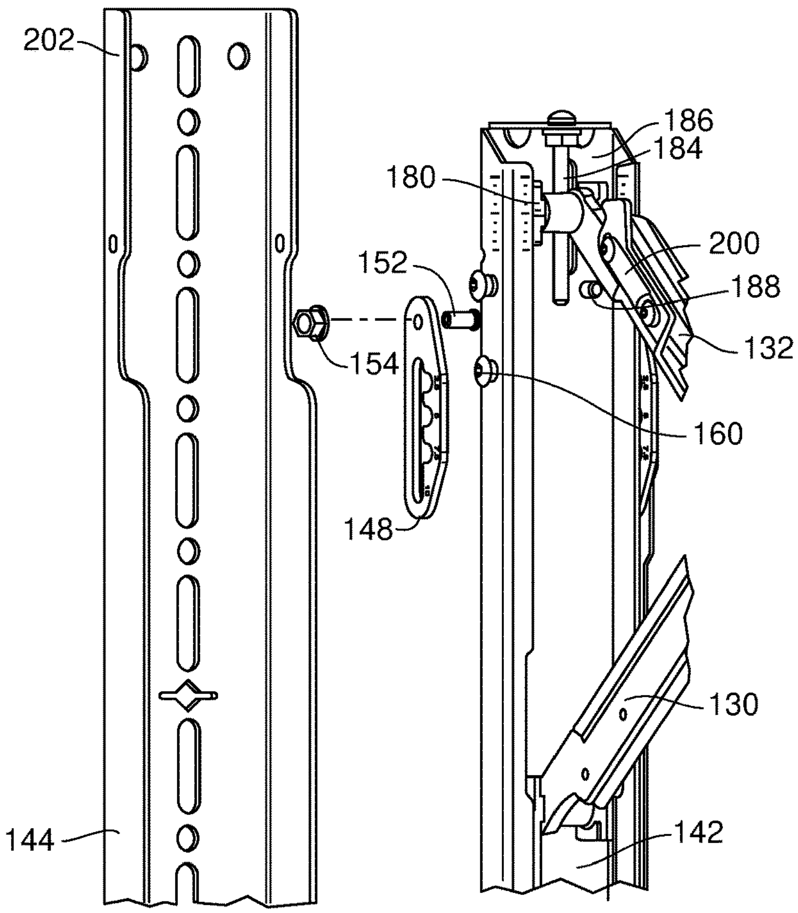
FIG. 14 is a partial exploded rear isometric view of the display mount of FIG. 12.
Figure 15:
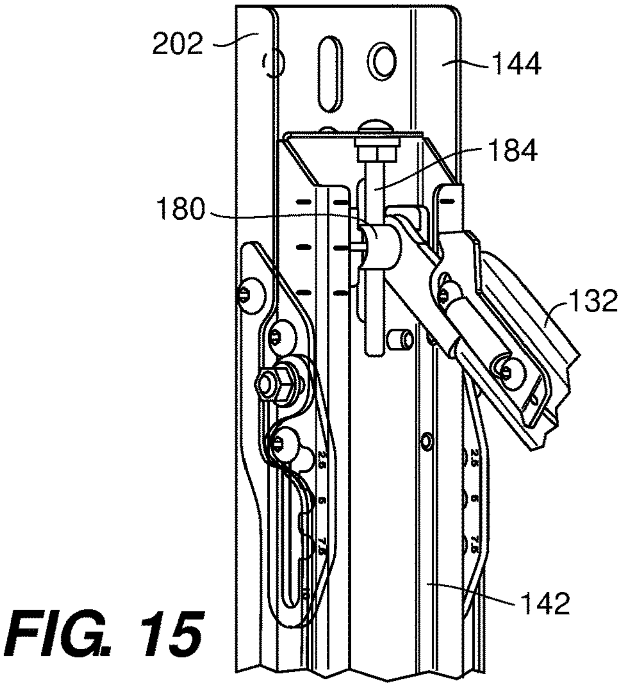
FIG. 15 is a rear isometric view of the display mount of FIG. 14 with portions depicted in phantom.

In-wall enclosure 30 can be installed in a wall structure 78. As depicted in FIGS. 8-10, wall structure 78 has vertical studs 80, which may be metal or wood, faced with membranes 82, 84, commonly made from ½ inch, ⅝ inch, or ¾ inch sheetrock. An aperture (not depicted) can be cut in membrane 82 or 84 corresponding to the dimensions of in-wall enclosure 30. In-wall enclosure 30 can be advanced into the aperture and, in the case of metal studs 80, secured in place with attachment hardware assembly 86. Each attachment hardware assembly 86 has threaded fastener 88, nut 90, and clamp 92. Nut 90 threads onto threaded fastener 88 and is pivotally coupled to clamp 92. As depicted in FIG. 7, clamp 92 can engage the rear side of membrane 82 or 84 to fasten housing 32 to wall structure 78. Threaded fasteners extend through apertures 94 in front face 68 of side flanges 46, 48. It will be appreciated that sheet metal screws (not depicted) screwed into a metal stud 80 may be substituted for attachment hardware assembly 86 in some embodiments. Alternatively, brackets 96 can be attached to the exterior surfaces of side walls 34, 36 and the in-wall box mounted prior to sheetrock installation to enable access to wiring by electricians. Each bracket 96 wraps around the front face of the stud 80, and enables the in-wall enclosures 30 to be attached to the studs 80 with screws (not depicted) through apertures 94.

As depicted in FIGS. 8, 9, and 10, it will be appreciated that multiple in-wall enclosures 30 can be installed in wall structure 78 to provide an adaptable array of mounting points for electronic display devices, such as large televisions 98, or mounting multiple separate smaller televisions in an array. As depicted in FIGS. 8 and 9, in-wall enclosures 30 can be mounted in adjacent stud spaces 100 to provide a relatively large volume behind television 98 to conceal wiring and peripherals without the necessity of cutting any of studs 80 upon installation or install headers. Further, in-wall enclosures 30 can be installed in alternating stud spaces as depicted in FIG. 10 to provide mounts on both sides of wall structure 78, again without cutting any studs 80. It will be appreciated that television 98 can be any electronic display device such as an LCD, LED, or OLED television or monitor, or any other similar device.

Figure 11:
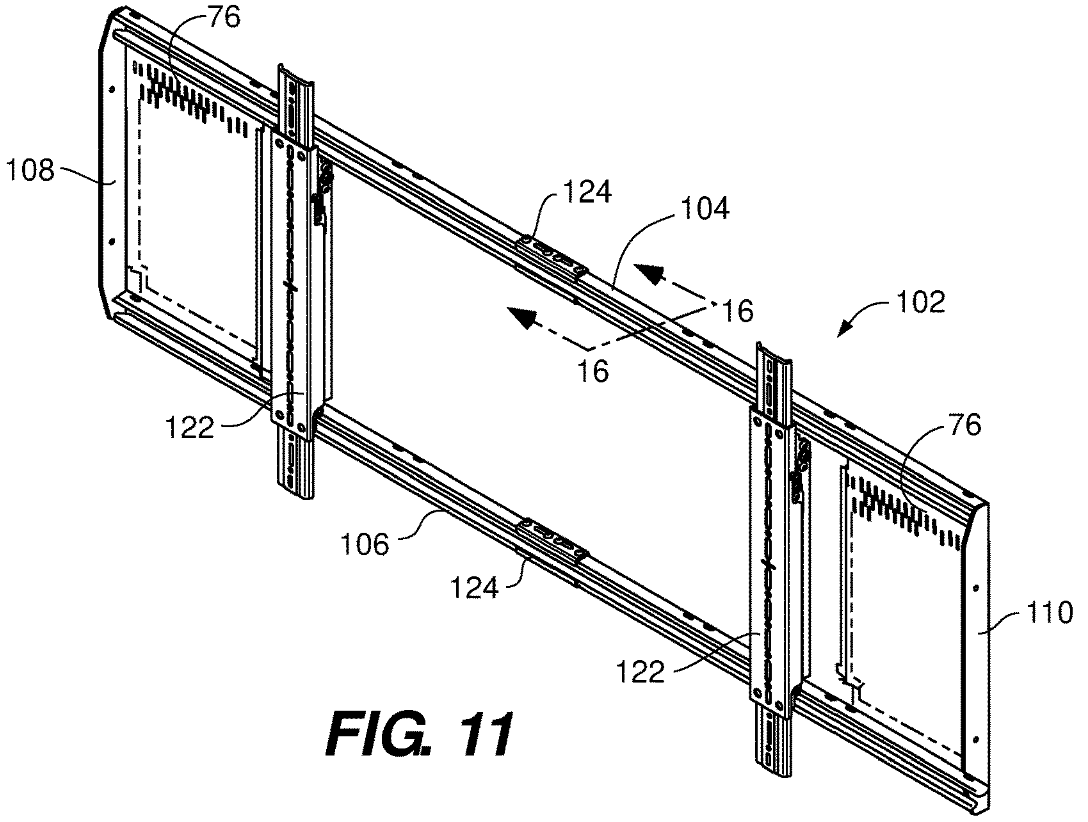
FIG. 11 is a front isometric view of a surface mount according to an embodiment of the invention.
Figure 16:
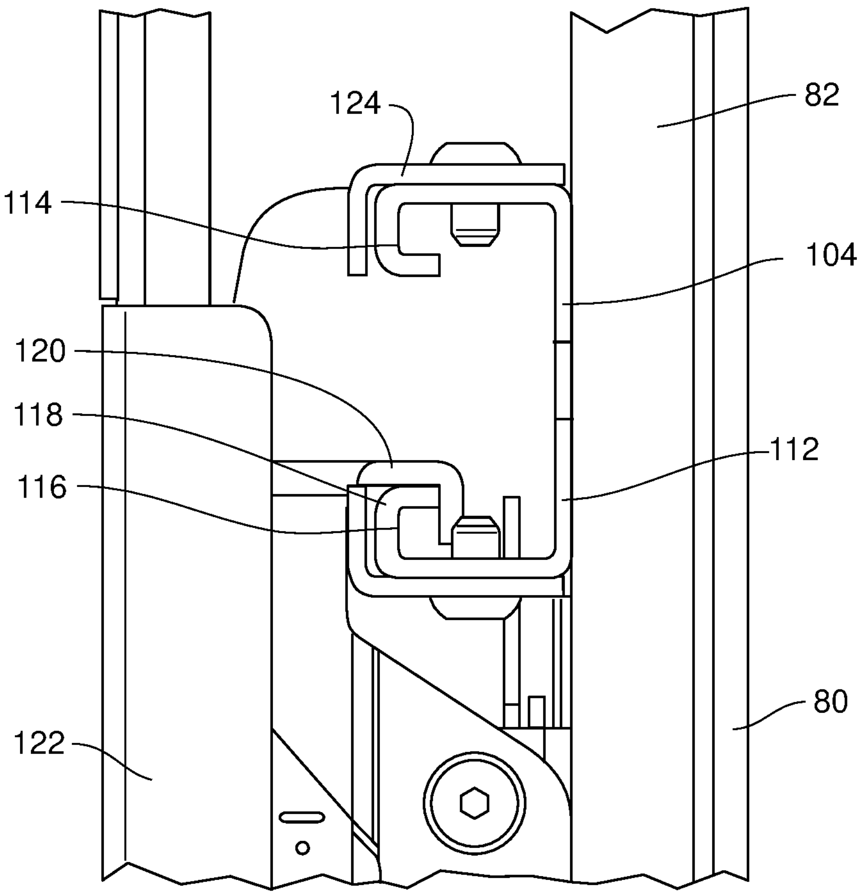
FIG. 16 is a cross-sectional view of the mount of FIG. 11 taken at Section 16-16 of FIG. 11.
Figure 17:
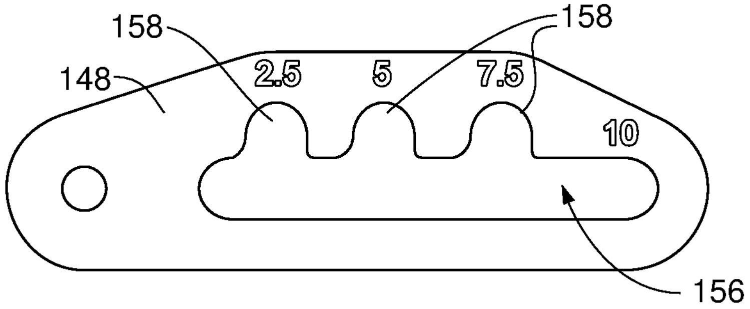
FIG. 17 is an elevation view of the tilt adjustment bracket of the mount of FIGS. 12-15.

In addition, it will be appreciated that in-wall enclosures 30 can be used in conjunction with a surface mount 102 as depicted in FIGS. 8, 11, and 16. Surface mount 102 generally includes top rail 104, bottom rail 106, and end caps 108, 110. As depicted in FIG. 16, top rail 104 and bottom rail 106 can be channels with a generally c-shaped profile. Back wall 112 is mounted abutting membrane 82, and outer ends 114, 116, are turned inward to form a receiving lip 118. Hook portion 120 of display mount 122 hooks around receiving lip 118 to secure display Mount 122 to surface mount 102. Connector 124 can be used to connect longitudinally adjacent sections of channel to increase the length of top rail 104 and bottom rail 106 to thereby accommodate larger televisions. End caps 108, 110, can couple top rail 104 and bottom rail 106 to provide a more aesthetically pleasing appearance to surface mount 102. Attachment plates 76 can be added to enable mounting or peripherals such as controllers, receivers, routers, and the like behind a mounted television 98.

Display mount 122 is depicted in FIGS. 12-18, and generally includes inner assembly 126, outer assembly 128, and scissor arms 130, 132. Inner assembly 126 generally includes track 134, top hook bracket 136 forming hook portion 120, and lower retaining assembly 138. Track 134 can be a generally c-shaped channel, and includes projecting bottom tab 140 forming hook portion 120 in conjunction with lower retaining assembly 138 at the bottom end of inner assembly 126.

Figure 18:
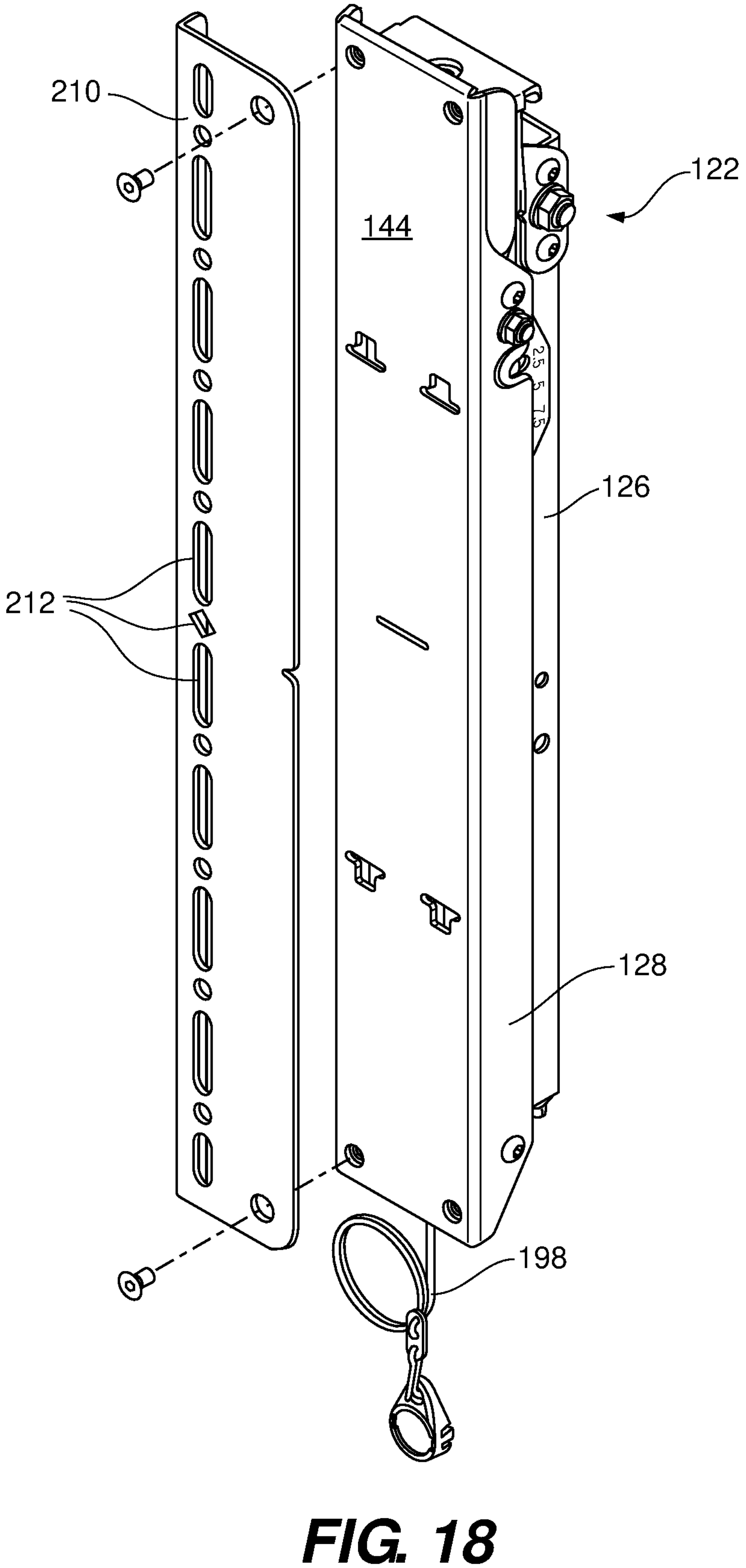
FIG. 18 is a front perspective view of a display mount according to FIG. 12.

Outer assembly 128 generally includes track 142 which can be a generally c-shaped channel, display interface 144, and tilt adjustment bracket 148. Alternatively, as depicted in FIG. 18, display interface 144 can include extension 210 defining apertures 212. Tilt adjustment bracket 148 is pivotally coupled to display interface 144 with bolt 152 and nut 154 and defines slot 156 with position notches 158. Rivet 160 extends from track 142 through slot 156. Display interface 144 is pivotally coupled to track 142 at rivets 157, 159.

Scissor arm 130 presents inner end 162 and outer end 164. Inner end 162 is pivotally coupled to track 134 with bolt 166. Outer end 164 is pivotally coupled to slid blocks 168 with pin 170. Slide blocks 168 are received, and slide vertically in the channel defined by track 142. Scissor arm 132 presents inner end 172 and outer end 174. Inner end 172 carries axle 176 having rollers 178, which roll in the c-shaped channel formed by track 134. Outer end 174 carries axle 180 which is pivotally coupled with slide blocks 182. Slide blocks 182 are received, and slide vertically in the c-shaped channel defined by track 142. Axle 180 is cross-drilled with an aperture (not depicted) that is threaded and receives vertical adjustment bolt 184. Slide blocks 182 are confined to sliding within the upper portion 186 of track 142 by stop screws 188. Scissor arm 130 and scissor arm 132 are pivotally coupled together with pin 190.

In use, in-wall enclosures 30 can be installed in desired positions in wall structure 78 by cutting apertures in membrane 82 between studs 80. Side flanges 46, 48, can be affixed to housing 32 with fasteners 54 to set the desired depth dimension A. Top flange 50 and bottom connector 52 can be attached to housing 32 with fasteners (not depicted). In-wall enclosures 30 can then be advanced into the apertures cut in membrane 82 or 84, and the in-wall enclosure 30 secured in place with clamp assemblies 86 in the case of steel studs or wood screws in the case of wood studs. Interface rails 58, 60, can be secured to side flanges 46, 48, with projecting lips 64, 66, in a desired position.

Display mounts 122 can then be attached to television 98 with front face 192 of display interface 144 abutting rear side 194 of television 98 using fasteners (not depicted) through aperture 196. Hook portions 120 of inner assembly 126 can be engaged with projecting lips 64, 66, to attach display mounts 122 and television 98 to in-wall enclosures 30. With television 98 attached to in-wall mounts 30, vertical adjustment bolts 184 on each display mount 122 can be rotated to adjust the relative height and skew of television 98 to confirm with the ceiling, floor, or adjacent televisions 98.

Television 98 can be tilted by pulling upper end 202 of display interface 144 to tilt outward, pivoting around rivets 157, 159. Tilt adjustment brackets 148 pivot around bolts 152, enabling slot 156 to slide around rivet 160. Notches 158 provide convenient detent stops so that upper end 202 can be disposed at pre-defined tilt positions such as 2.5, 5, 7.5, and 10 degrees relative to vertical, or can be selected to correspond to any other desired positions. Television 98 can be shifted away from the wall by pulling release cord 198 to release latch assembly 200. Television 98 can then be positioned closer to or further away from wall structure 78 via scissor arms 130, 132, and can also be pivoted to a limited degree side-to-side by differential extension of display mounts 122.

Hence, as set forth above, the inventions described herein can provide a flexible and modular approach to mounting larger televisions on a stud wall with an in-wall enclosure without the necessity to cut studs to install headers. Peripherals such as controllers, receivers, an routers can be installed inside the in-wall enclosure for purposes of concealment and enabling the television to be positioned closer to the wall without interference.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Suh combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A mount for attaching an electronic display device to a wall of a structure, comprising:

a housing having a pair of opposing side walls, a top wall, a bottom wall, and a rear wall defining an enclosure with a front opening;

a pair of side flanges, each side flange presenting a front face and operably coupled to a separate one of the opposing side walls such that the side flange is selectively shiftable to alter a first distance between the front face and the rear wall of the housing;

a pair of spaced-apart interface rails extending between the opposing side walls of the housing, each interface rail having a projecting lip, each interface rail being selectively shiftable to alter a second distance between the projecting lip of the interface rail and the rear wall of the housing; and a pair of display mounts, each display mount removably coupled to each of the interface rails and adapted to attach to the electronic display device to couple the electronic display device to the housing.

2. The mount of claim 1, further comprising an attachment plate disposed inside the enclosure of the housing, the attachment plate adapted to receive a plurality of peripheral electronic devices selected from the group consisting of controllers, receivers, routers, and power supplies.

3. The mount of claim 1, wherein the housing further comprises a plurality of brackets adapted to attach the housing to a pair of spaced-apart studs of the wall.

4. The mount of claim 1, wherein each of the side flanges further comprises a plurality of hardware attachment assemblies for attaching the housing to the wall, each hardware attachment assembly comprising a threaded fastener, a nut, and a clamp.

5. The mount of claim 1, wherein each of the pair of display mounts comprises an inner assembly and an outer assembly coupled by a pair of scissor arms, the inner assembly coupled to the interface rails and the outer assembly adapted to attach to the electronic display device, the scissor arms enabling the electronic display device to be selectively shifted between a first position proximate the housing and a second position spaced-apart from the housing.

6. The mount of claim 5, wherein the outer assembly comprises a channel operably coupled to the scissor arms and a display interface adapted to attach to the electronic display device, the display interface operably coupled with the channel so as to enable the display interface to be selectively shifted relative to the channel to vertically tilt the electronic display device.

7. The mount of claim 6, wherein the display interface is operably coupled with the channel with a tilt adjustment bracket, the tilt adjustment bracket providing a plurality of detent stops such that the electronic display device can be disposed at a plurality of pre-defined tilt positions.

8. The mount of claim 6, wherein the outer assembly further comprises a vertical adjustment assembly enabling selective vertical shifting of the outer assembly relative to the scissor arms.

9. A system for mounting an electronic display device to a wall of a structure, the system comprising: a plurality of mounts, each mount comprising: a housing having a pair of opposing side walls, a top wall, a bottom wall, and a rear wall defining an enclosure with a front opening; a pair of side flanges, each side flange presenting a front face and operably coupled to a separate one of the opposing side walls such that the side flange is selectively shiftable to alter a first distance between the front face and the rear wall of the housing; a pair of spaced-apart interface rails extending between the opposing side walls of the housing, each interface rail having a projecting lip, each interface rail being selectively shiftable to alter a second distance between the projecting lip of the interface rail and the rear wall of the housing; and a display mount, the display mount removably coupled to each of the interface rails; wherein the display mount of a first one of the plurality of mounts and the display mount of a second one of the plurality of mounts are attached to the electronic display device to attach the electronic display device to the wall.

10. The system of claim 9, wherein at least one of the plurality of mounts further comprises an attachment plate disposed inside the enclosure of the housing, the attachment plate adapted to receive a plurality of peripheral electronic devices selected from the group consisting of controllers, receivers, routers, and power supplies.

11. The system of claim 9, wherein the housing of each mount further comprises a plurality of brackets adapted to attach the housing to a pair of spaced-apart studs of the wall.

12. The system of claim 9, wherein each of the side flanges of each mount further comprises a plurality of hardware attachment assemblies for attaching the housing to a wall of a structure, each hardware attachment assembly comprising a threaded fastener, a nut, and a clamp.

13. The system of claim 9, wherein each of the display mounts comprises an inner assembly and an outer assembly coupled by a pair of scissor arms, the inner assembly coupled to the interface rails and the outer assembly adapted to attach to the electronic display device, the scissor arms enabling the electronic display device to be selectively shifted between a first position proximate the housing and a second position spaced-apart from the housing.

14. The system of claim 13, wherein the outer assembly comprises a channel operably coupled to the scissor arms and a display interface adapted to attach to the electronic display device, the display interface operably coupled with the channel so as to enable the display interface to be selectively shifted relative to the channel to vertically tilt the electronic display device.

15. The system of claim 14, wherein the display interface is operably coupled with the channel with a tilt adjustment bracket, the tilt adjustment bracket providing a plurality of detent stops such that the electronic display device can be disposed at a plurality of pre-defined tilt positions.

16. The system of claim 14, wherein the outer assembly further comprises a vertical adjustment assembly enabling selective vertical shifting of the outer assembly relative to the scissor arms.

17. An electronic display system, the system comprising: a wall comprising a plurality of spaced-apart studs forming a plurality of stud spaces therebetween, and a membrane on one side of the studs; a plurality of electronic display devices; and a plurality of mounts, each mount comprising: a housing having a pair of opposing side walls, a top wall, a bottom wall, and a rear wall defining an enclosure with a front opening; a pair of side flanges, each side flange presenting a front face and operably coupled to a separate one of the opposing side walls such that the side flange is selectively shiftable to alter a first distance between the front face and the rear wall of the housing; a pair of spaced-apart interface rails extending between the opposing side walls of the housing, each interface rail having a projecting lip, each interface rail being selectively shiftable to alter a second distance between the projecting lip of the interface rail and the rear wall of the housing; and at least one display mount, each display mount removably coupled to each of the interface rails and adapted to attach to the electronic display device to couple the electronic display device to the housing; wherein each mount of the plurality of mounts is arranged in a separate one of the plurality of stud spaces and through an aperture in the membrane.

18. The system of claim 17, wherein at least one of the plurality of mounts further comprises an attachment plate disposed inside the enclosure of the housing, the attachment plate adapted to receive a plurality of peripheral electronic devices selected from the group consisting of controllers, receivers, routers, and power supplies.

19. The system of claim 17, wherein each mount of the plurality of mounts is arranged immediately adjacent another one of the plurality of mounts.

20. The system of claim 17, wherein each of the display mounts comprises an inner assembly and an outer assembly coupled by a pair of scissor arms, the inner assembly coupled to the interface rails and the outer assembly adapted to attach to the electronic display device, the scissor arms enabling the electronic display device to be selectively shifted between a first position proximate the housing and a second position spaced-apart from the housing.

21. The system of claim 20, wherein the outer assembly comprises a channel operably coupled to the scissor arms and a display interface adapted to attach to the electronic display device, the display interface operably coupled with the channel so as to enable the display interface to be selectively shifted relative to the channel to vertically tilt the electronic display device.

22. The system of claim 21, wherein the display interface is operably coupled with the channel with a tilt adjustment bracket, the tilt adjustment bracket providing a plurality of detent stops such that the electronic display device can be disposed at a plurality of pre-defined tilt positions.

23. The system of claim 21, wherein the outer assembly further comprises a vertical adjustment assembly enabling selective vertical shifting of the outer assembly relative to the scissor arms.

* * * * *